United States Patent
Ahner

(10) Patent No.: US 8,499,866 B2
(45) Date of Patent: Aug. 6, 2013

(54) DEVICE AND METHOD FOR OPERATING A DRIVE HAVING AN ELECTRICALLY DRIVABLE AXLE

(75) Inventor: Peter Ahner, Boeblingen (DE)

(73) Assignee: Robert Bosch GmbH, Stuttgart (DE)

(*) Notice: Subject to any disclaimer, the term of this patent is extended or adjusted under 35 U.S.C. 154(b) by 119 days.

(21) Appl. No.: 12/998,051

(22) PCT Filed: Jul. 27, 2009

(86) PCT No.: PCT/EP2009/059646
§ 371 (c)(1),
(2), (4) Date: May 13, 2011

(87) PCT Pub. No.: WO2010/028905
PCT Pub. Date: Mar. 18, 2010

(65) Prior Publication Data
US 2011/0203400 A1    Aug. 25, 2011

(30) Foreign Application Priority Data

Sep. 12, 2008 (DE) .................. 10 2008 042 048

(51) Int. Cl.
*B60K 1/00* (2006.01)
(52) U.S. Cl.
USPC ....................................... 180/65.1
(58) Field of Classification Search
USPC .......................................... 180/65.1–65.29
See application file for complete search history.

(56) References Cited

U.S. PATENT DOCUMENTS

| | | | | |
|---|---|---|---|---|
| 2,140,012 A * | 12/1938 | Hayes | ................. | 476/19 |
| 6,016,883 A * | 1/2000 | Yamada | ................. | 180/247 |
| 6,123,163 A * | 9/2000 | Otsu et al. | ................. | 180/65.8 |
| 6,416,437 B2 * | 7/2002 | Jung | ................. | 475/8 |
| 6,427,793 B1 * | 8/2002 | Hanada et al. | ................. | 180/65.25 |
| 6,805,211 B2 * | 10/2004 | Fujikawa | ................. | 180/65.25 |
| 6,886,647 B1 * | 5/2005 | Gotta | ................. | 180/65.1 |
| 7,610,976 B2 * | 11/2009 | Holmes et al. | ................. | 180/65.29 |
| 8,020,681 B2 * | 9/2011 | Davis | ................. | 192/45.1 |
| 8,202,187 B2 * | 6/2012 | Man | ................. | 475/221 |
| 2002/0134634 A1 * | 9/2002 | Ito et al. | ................. | 192/35 |
| 2003/0062206 A1 * | 4/2003 | Fujikawa | ................. | 180/65.2 |
| 2004/0040759 A1 * | 3/2004 | Shimizu et al. | ................. | 180/65.2 |
| 2007/0256870 A1 * | 11/2007 | Holmes et al. | ................. | 180/65.2 |
| 2008/0149448 A1 * | 6/2008 | Hemphill et al. | ................. | 192/45.1 |
| 2010/0114442 A1 * | 5/2010 | Kadota | ................. | 701/68 |
| 2010/0181157 A1 * | 7/2010 | Smetana | ................. | 192/46 |
| 2011/0203400 A1 * | 8/2011 | Ahner | ................. | 74/473.1 |

FOREIGN PATENT DOCUMENTS

| | | |
|---|---|---|
| CN | 101096179 | 1/2008 |
| CN | 101244687 | 8/2008 |
| EP | 0 224 144 | 0/1987 |
| EP | 1 167 104 | 1/2002 |
| EP | 1 506 890 | 2/2005 |
| EP | 1 818 236 | 8/2007 |

* cited by examiner

*Primary Examiner* — J. Allen Shriver, II
*Assistant Examiner* — Erez Gurari
(74) *Attorney, Agent, or Firm* — Kenyon & Kenyon LLP

(57) ABSTRACT

A drive device for a vehicle, an electric machine and an axle which is drivable by the electric machine. A disengageable mechanical coupling is provided between the drivable axle and the electric machine. This coupling is designed as a shiftable freewheel coupling.

15 Claims, 2 Drawing Sheets

DEVICE AND METHOD FOR OPERATING A DRIVE HAVING AN ELECTRICALLY DRIVABLE AXLE

BACKGROUND OF THE INVENTION

1. Field of the Invention

The present invention relates to a device and a method for operating a drive having an electrically drivable axle, for example in a hybrid vehicle.

2. Description of Related Art

Vehicles having a hybrid drive structure have at least two drive units. These are usually an internal combustion engine and at least one electric motor. However, the use of other drive units such as hydraulic motors, for example, is also possible. Thus, the drive torque during driving mode of the hybrid vehicle may be applied by both drive units or by only a single drive unit. A vehicle is known from published European patent document EP 0 224 144 A1 which has a conventional main drive axle which is drivable by an internal combustion engine. With increased slip of the wheels of the main drive axle, the wheels of a connectable drive axle may be automatically driven with the aid of a separate auxiliary drive unit, in particular an electric motor.

BRIEF SUMMARY OF THE INVENTION

The device according to the present invention for a vehicle having an electric machine and an axle which is drivable by the electric machine is characterized in that the disengageable mechanical coupling between the drivable axle and the electric machine is designed as a simple, robust mechanical component. This disengageable mechanical coupling is designed as a shiftable freewheel coupling. The technical background of this embodiment is that the electric machine may be disengaged from the drivable axle. The electric machine is disengaged from the drivable axle using a shiftable freewheel coupling. This freewheel coupling may be in one of two transmission positions.

In one transmission position a torque is transmitted from the drivable axle to the electric machine, and in the other transmission position a torque is transmitted from the electric machine to the drivable axle. In both cases, the driving shaft and the driven shaft are automatically disengaged from one another as soon as the driven shaft has a higher rotational speed than the driving shaft. Any necessary synchronizations for changing the transmission positions are carried out with the aid of the electric machine. The advantage of this embodiment is that a robust design which is economical and maintenance- and wear-free may be used as a coupling.

In various driving situations of a hybrid vehicle it is advantageous to decouple the electric machine from the rear axle. For example, an electric machine is not able to deliver appreciable torque at high rotational speeds. When no gearbox is provided between the electric machine and the drivable axle, for space or cost reasons, for example, it is advantageous from an energy standpoint to decouple the electric machine from the drive axle at high rotational speeds in order to avoid co-rotation of the electric machine and the associated losses. For the same reason, it is advantageous to decouple the electric machine from the driven axle when the vehicle is rolling.

According to the present invention, it is provided that the device has means which are suitable for carrying out a monitoring concept. The technical background is that an error response is carried out if the freewheel coupling or the electric drive malfunctions. This results in the advantage according to the present invention that safe operation of the vehicle is ensured.

In one refinement of the present invention, it is provided that the blocking direction of the shiftable freewheel coupling may be controlled with the aid of an actuator. With the aid of an actuator, the shiftable freewheel coupling may thus be controlled in such a way that it is transferred to a predefinable transmission position. Thus, it is predefined whether a torque is transmitted from the drivable axle to the electric machine, or vice versa. For this purpose, the actuator displaces a hub on the spline shaft at the possible engagement speed of the freewheel coupling housing and the hub until the hub is completely engaged in the clamping element. It is provided that the two clamping elements have opposite blocking directions. This allows the freewheel coupling to be brought into the "acceleration" and "recuperation" positions. Actuators such as those employed in automated manual transmissions, for example, may be used for this purpose.

During acceleration operations of the vehicle, the freewheel coupling is shifted in such a way that a torque flow from the electric machine to the axle is possible. If the electric machine is no longer able to deliver more torque at increasing rotational speed than is necessary for its own acceleration, it would be accelerated via the rotating drive axle. At this moment the freewheel coupling disengages and decouples the electric machine, so that no drive torque is transmitted from the rotating drive axle to the electric machine. In this case the electric machine may be braked. In particular, the rotational energy of the electric machine may be recuperated during the braking operation. During recuperation operations of the vehicle, the freewheel coupling is shifted in such a way that a torque is transmitted from the rotating drive axle toward the electric machine. To be able to carry out the switching operation from "acceleration" to "recuperation" (or vice versa) without jerking, the electric machine must be accelerated to a rotational speed which is equal to or slightly greater than the rotational speed of the drivable axle in order to engage the freewheel coupling. The advantage of this embodiment is that a robust machine element which is economical and maintenance- and wear-free may be used as a coupling. The control is limited to the controllable switching of the blocking direction of the shiftable freewheel coupling. As a result, complicated torque control of a coupling is dispensed with.

In another refinement of the present invention, it is provided that the actuator is actively operated in order to control the blocking direction of the shiftable freewheel coupling for the "acceleration" operating state. When the actuator is not operated, the blocking direction of the shiftable freewheel coupling is automatically controlled for the "recuperation" operating state. The technical background of this embodiment is that the control cage of the freewheel coupling is actively displaced with the aid of the actuator in order to control the shiftable freewheel coupling for the "acceleration" operating state. In this case the blocking direction of the shiftable freewheel coupling is controlled in such a way that it is possible to transmit a torque from the electric machine to the drivable axle. When the actuator is not activated, the control cage moves with the aid of restoring springs in such a way that the shiftable freewheel coupling is controlled for the "recuperation" operating state. In this case the blocking direction of the shiftable freewheel coupling is controlled in such a way that it is possible to transmit a torque from the drivable axle to the electric machine. The advantage of this embodiment is that a unidirectional actuator is sufficient for activating the freewheel coupling.

The Method according to the present invention for carrying out a monitoring concept for a vehicle having an electric machine and an axle which is drivable by this electric machine, in which a disengageable mechanical coupling is provided between the drivable axle and the electric machine, is characterized in that the mechanical coupling is designed as a shiftable freewheel coupling, and the blocking direction of the freewheel coupling is controlled as a function of the operating state of the vehicle, and various error responses are carried out as a function of the operating state of the vehicle and as a function of the state of the freewheel coupling. The technical background of this embodiment is that various error consequences which arise as a function of the operating state of the vehicle and as a function of the state of the freewheel coupling are taken into account.

For example, during forward travel the non-activated control cage may be referred to as a safe operating state, since in this case it is not possible to transmit a torque of the electric machine to the drivable axle. When the actuator is not active, the freewheel coupling is automatically set for the transmission of torque of the "recuperation" operating state of the vehicle (in which the axle drives the electric machine) via restoring springs. The torque transmission during the "acceleration" operating state of the vehicle (in which the electric machine drives the axle) is allowed by the actively operated control cage only when the electric machine is in motor operation. The switchover is carried out together with or just before the switch to motor operation.

For travel in reverse, the relationships are interchanged. In this case, for the safe operating state the control cage must be activated to prevent torque of the electric machine from being transmitted to the drivable axle. A monitoring concept for A vehicle is advantageously provided by using this method. As a function of the operating state of the vehicle and of the state of the freewheel coupling, various error responses are carried out which ensure the continued safe operation of the vehicle.

Another refinement of the present invention is characterized in that the method recognizes at least the "acceleration" and "recuperation" operating states of the vehicle and the "freewheel coupling does not engage" and "freewheel coupling jams" states of the freewheel coupling. The technical background of this embodiment of the present invention is that the operating states during which a torque is transmitted from the electric machine to the drivable axle, or vice versa, are recognized. These are relevant operating states of the vehicle, since the acceleration operation is assisted by the electric machine, in particular at lower rotational speeds of the driven axle. The electric machine is likewise coupled to the drivable axle during the "recuperation" operating state. In this case, however, a torque of the rotating axle is transmitted to the electric machine, which is thus able to recuperate kinetic energy of the vehicle. The advantage of this embodiment is that the electric machine efficiently assists the vehicle during the "acceleration" operating state, and that with the aid of the electric machine kinetic energy of the vehicle is converted into electrical energy during the "recuperation" operating state of the vehicle. In addition, the states of the freewheel coupling which indicate a malfunction of the freewheel coupling are recognized. The advantage of this embodiment in the form of a monitoring concept is that safe operation of the vehicle may be ensured by recognizing these operating states of the vehicle and of the freewheel coupling.

Another refinement of the method is characterized in that during the "recuperation" operating state of the vehicle, the "freewheel coupling does not engage" state of the freewheel coupling is recognized in such a way that the rotational speed of the electric machine, in particular under electrical load, does not correlate with the rotational speed of the drivable axle. The technical background of this embodiment is that during the "recuperation" operating state of the vehicle a torque is to be transmitted from the drivable axle to the electric machine. When the freewheel coupling functions as requested and is therefore engaged, the electric machine has either the same rotational speed as the drivable axle, or has a rotational speed at a specified gear ratio with respect to same. When the rotational speed of the electric machine does not correlate in this manner with the drivable axle, this indicates that the freewheel coupling is not engaged. Accordingly, the torque of the drivable axle is not transmitted to the electric machine as requested. The advantage of this embodiment is that a faulty state of the freewheel coupling may be recognized. This may trigger an error response, for example, which ensures continued safe operation of the vehicle.

Another refinement of the present invention is characterized in that during the "recuperation" operating state of the vehicle, the "freewheel coupling jams" state of the freewheel coupling is recognized in such a way that when the electric machine is temporarily in motor operation, the rotational speed of the electric machine correlates with the rotational speed of the drivable axle. The technical background of this embodiment is that for a properly disengaging freewheel coupling, the machine rotational speed would increase in motor operation. However, when the rotational speed of the drivable axle correlates with the rotational speed of the electric machine, this indicates that the freewheel coupling is not properly disengaging. The advantage of this embodiment is that a faulty state of the freewheel coupling may be recognized. This may trigger an error response, for example, which ensures continued safe operation of the vehicle.

Another refinement of the present invention is characterized in that the temporary motor operation is carried out at periodic intervals during noncritical driving situations. The technical background of this embodiment is that during noncritical driving states (low transverse acceleration or longitudinal acceleration, or deceleration, of the vehicle) a switch to motor operation is temporarily made without switching the control cage to "acceleration." To prevent impairment of the driving dynamics of the vehicle, this temporary motor operation is carried out only during noncritical driving situations. The advantage of this embodiment is that continued safe operation of the vehicle is possible even during the temporary motor operation, and the driving dynamics are not influenced.

In another refinement of the present invention, it is provided that during the "recuperation" operating state of the vehicle and when an event signal is present, the method generates a braking torque at the drivable axle, and the actuator is operated in order to control the blocking direction of the shiftable freewheel coupling for the "acceleration" operating state. The technical background of this embodiment is that during the "recuperation" operating state of the vehicle an excessively high braking torque, which is caused in particular by the electric machine, results in slip at the drive wheels of the drivable axle. This may result in an unstable driving dynamic characteristic (skidding, for example) of the vehicle. The excessively high braking torque may be caused, for example, by a malfunction in the electric drive, in particular a short circuit of the electric machine. During this situation, a high torque is transmitted via the freewheel coupling, and a switching operation from "recuperation" to "acceleration" is therefore not possible. To allow the switching operation, the torque to be transmitted via the freewheel coupling must be minimized or changed in direction. For this purpose, the drivable axle is briefly and intensely braked, for example with the aid of the brakes at the drive wheels mounted on the drivable axle. At this moment the shiftable freewheel coupling is switched to the "acceleration" operating state with the aid of the actuator, and the faulty braking torque is decoupled from the drivable axle. The drive wheels then accelerate over the roadway. Safe operation with regard to driving dynamics is possible with the aid of the static friction force which is once again present. The drivable axle is briefly braked as a response to the presence of an event signal. The event signal is emitted by a control unit when an error is diagnosed in the electric drive (in particular a high braking torque at the drivable axle which is not caused by the brakes of the drive wheels), when the electric machine has a high braking torque, and/or before the electric machine is short-circuited. The advantage of this embodiment is that safe operation of the vehicle is thus ensured, even at a high braking torque of the electric machine.

Another refinement of the present invention is characterized in that during the "acceleration" operating state of the vehicle, the method recognizes the "freewheel coupling does not engage" state of the freewheel coupling in such a way that the rotational speed of the electric machine rapidly increases, and in particular does not correlate with the rotational speed of the drivable axle. The technical background of this embodiment is that the faulty "freewheel coupling does not engage" state of the freewheel coupling is recognized by the fact that the rotational speed of the load-free electric machine in the run-up state increases very rapidly. The rapid increase in the rotational speed of the electric machine may be recognized in particular in that the rotational speed of the electric machine does not correlate with the rotational speed of the drivable axle. The nonengaging freewheel coupling does not allow a torque of the electric machine to be delivered to the drivable axle. The advantage of this embodiment is that a faulty state of the freewheel coupling may be recognized. This may trigger an error response, for example, which ensures continued safe operation of the vehicle.

Another refinement of the present invention is characterized in that during the "acceleration" operating state of the vehicle, the method recognizes the "freewheel coupling jams" state of the freewheel coupling in such a way that in temporary motor operation of the electric machine, the rotational speed of the electric machine does not increase, and in particular correlates with the rotational speed of the drivable axle, and the actuator being temporarily not operated in order to control the blocking direction of the shiftable freewheel coupling for the "recuperation" operating state of the vehicle. The technical background of this embodiment is that in spite of the actuator being temporarily not operated in order to control the blocking direction of the shiftable freewheel coupling for the "recuperation" operating state of the vehicle, in temporary motor operation of the electric machine the rotational speed of the electric machine does not increase. This indicates that the electric machine is still delivering a torque to the drivable axle. In turn, this means that the freewheel coupling is not properly disengaging. As long as the internal combustion engine is in operation, the effect on the vehicle is compensated for via an appropriate control of the internal combustion engine. In recuperation phases with the internal combustion engine shut off, the freewheel coupling test is to be carried out over a very short period of time, for example 30-50 ms. As the result of play in the drive train, the effect is hardly perceived by the driver. The advantage of this embodiment is that a faulty state of the freewheel coupling may be recognized. This may trigger an error response, for example, which ensures continued safe operation of the vehicle.

Another refinement of the present invention is characterized in that, at least during the "freewheel coupling does not engage" and "freewheel coupling jams" states of the freewheel coupling, an error message is output and/or an appropriate entry in the error memory is made as an error response. The technical background and advantage is that for these safety-relevant "freewheel coupling does not engage" and "freewheel coupling jams" errors, an error message is output in order to appropriately warn the driver and/or to make an appropriate entry in the error memory to allow an error diagnosis during a subsequent inspection of the vehicle.

Another refinement of the present invention is characterized in that during the "recuperation" operating state of the vehicle and the "freewheel coupling does not engage" state of the freewheel coupling, an error message is output to the driver as an error response. The technical background is that for this error an error message to the driver is sufficient, since continued safe operation is ensured. It is advantageous that the driver is informed that it is no longer possible to recuperate the kinetic energy of the vehicle, and thus the battery is no longer recharged. The driver is thus notified that the travel range of the vehicle is limited, in particular when the vehicle electrical system is supplied by the traction battery, which is indicated to the driver.

Another refinement of the present invention is characterized in that during the "recuperation" operating state of the vehicle and the "freewheel coupling jams" state of the freewheel coupling, a first emergency mode with greatly limited speed is set as an error response. The technical background is that for this error the electric machine is no longer disengageable from the drivable axle, but safe operation of the vehicle must still be ensured. Continued operation of the vehicle may result in overload of the electrical system. Damage to the electrical system may advantageously be avoided with the aid of the emergency mode.

Another refinement of the present invention is characterized in that during the "acceleration" operating state of the vehicle and the "freewheel coupling does not engage" state of the freewheel coupling, a second emergency mode is set as an error response. The technical background is that for this error the electric machine is not coupleable to the drivable axle. Assistance to the drive with the aid of the electric machine, in particular electric driving and boosting, is no longer possible. This reduces the acceleration capability and the maximum speed of the vehicle. In addition, the generator function is maintained. There is no corresponding discharge of the battery, and accordingly the charge strategy must be adapted for continued travel. The driver is advantageously informed of this operating state, and the operational control is set in the form of a second emergency mode. This may, but does not have to, result in limitation of the driving speed.

Another refinement of the present invention is characterized in that during the "acceleration" operating state of the vehicle and the "freewheel coupling jams" state of the freewheel coupling, a first emergency mode with greatly limited speed is set as an error response. The technical background is that for this error the electric machine is no longer disengageable from the drivable axle. For safe operation of the vehicle, it must be ensured that the electric machine is disengageable from the drivable axle at all times. With the aid of the emergency mode with greatly limited speed, the vehicle may advantageously be driven to the nearest repair shop.

The described example embodiments of the invention concern the device and the method for forward travel of the vehicle. For travel in reverse, the actuator for the "recuperation" operating state of the vehicle is actively operated, and for the "acceleration" operating state of the vehicle it is not operated. Similarly, for travel in reverse the error responses for the monitoring concept are interchanged with regard to the operating states of the vehicle.

DETAILED DESCRIPTION OF THE INVENTION

Figure 1:
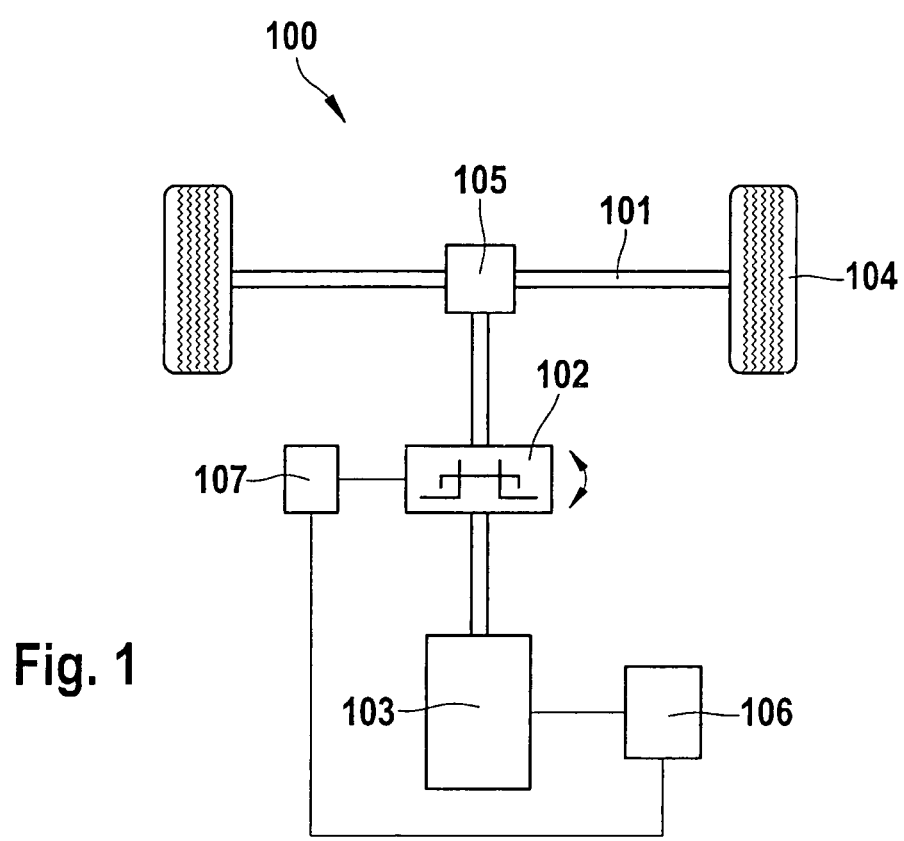
FIG. 1 shows a schematic illustration of a drive having an electrically drivable axle.

FIG. 1 shows a schematic illustration of a drive having an electrically drivable axle 100 which has an electric machine 103, and an electrically drivable axle 101 having drive wheels 104 and a differential 105. The mechanical coupling between electric machine 103 and electrically drivable axle 101 is implemented with the aid of a shiftable freewheel coupling 102. When shiftable freewheel coupling 102 is in a transmission position, a torque may be transmitted from drivable axle 101 to electric machine 103, or vice versa. The change between the transmission positions or blocking directions is made with the aid of actuator 107, actuator 107 being actively operated in order to control the blocking direction of shiftable freewheel coupling 102 for the "acceleration" operating state for forward travel. When actuator 107 is not actively operated, the blocking direction of shiftable freewheel coupling 102 is automatically controlled for the "recuperation" operating state with the aid of restoring springs. For travel in reverse, the control of actuator 107 with regard to the operating states of the vehicle is interchanged. A control unit 106 is provided for controlling actuator 107 and electric machine 103, and for monitoring the rotational speeds of electric machine 103 and of drivable axle 101, and for carrying out the monitoring concept.

Figure 2:
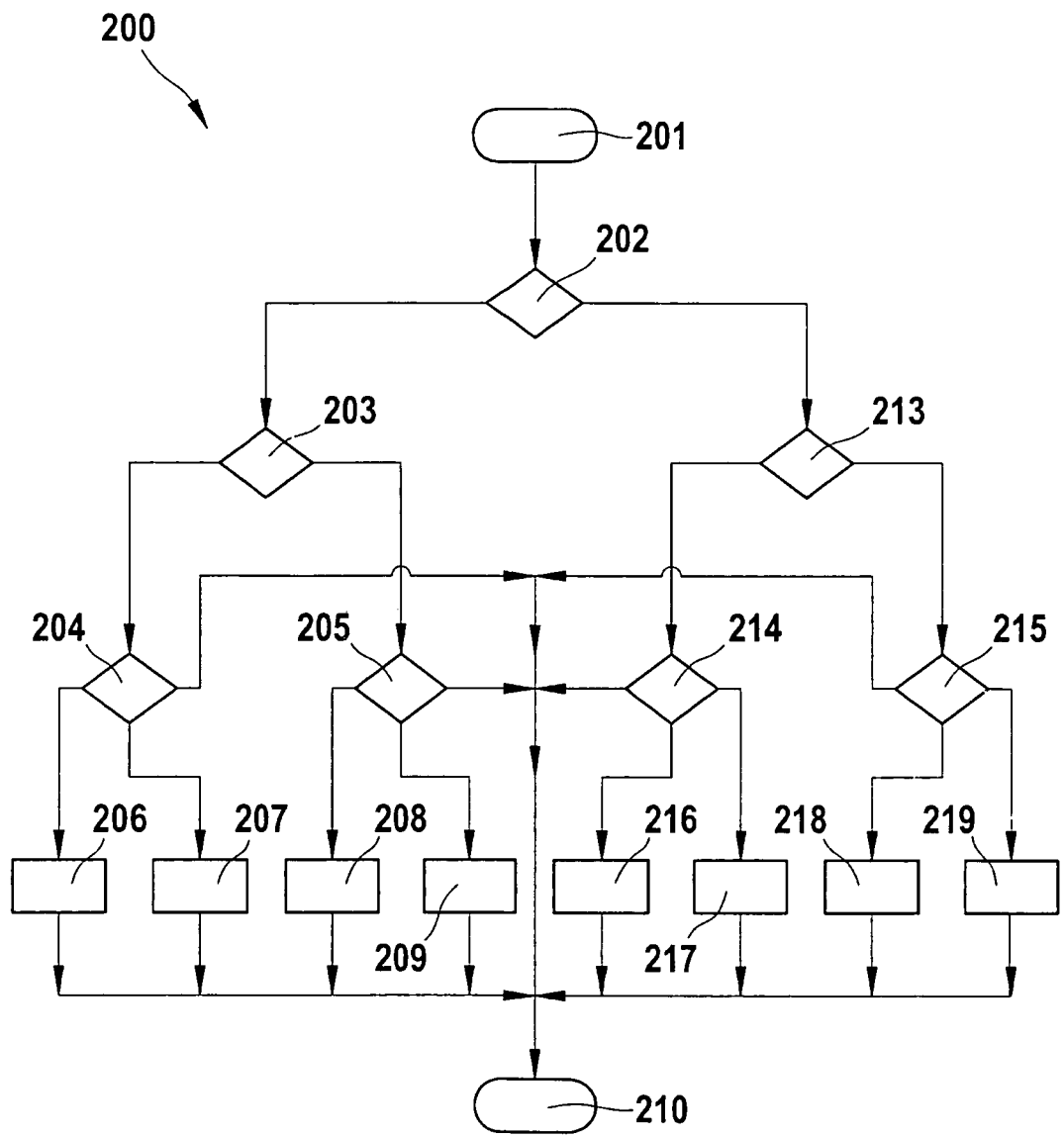
FIG. 2 shows a method for operating an electrically drivable axle.

FIG. 2 shows a method for operating an electrically drivable axle 200. The method is started in step 201. In step 202 the instantaneous direction of travel of the vehicle is subsequently queried. Depending on whether the vehicle is traveling in the forward or the reverse direction, the method branches to steps 203 or 213. If the vehicle is traveling forward, the method branches to step 203. The operating state of the vehicle is queried in step 203. In the present exemplary embodiment, the system is able to recognize the "recuperation" and "acceleration" operating states. If the "acceleration" operating state is instantaneously recognized in step 203, the blocking direction of shiftable freewheel coupling 102 is controlled in such a way that transmission of a torque from electric machine 103 to drivable axle 101 is possible, and the method branches to step 205. The state of the freewheel coupling is queried in step 205. In the present exemplary embodiment, the system is able to recognize the "freewheel coupling does not engage" and the "freewheel coupling jams" states of the freewheel coupling. Depending on which state of the freewheel coupling is recognized, the method branches to step 208 or 209. If the "freewheel coupling jams" state of the freewheel coupling is recognized, the method branches to step 208, in which as an error response a first emergency mode with greatly limited speed is set, and an error message is output, in particular to the driver, and/or an appropriate entry is made in the error memory. If the "freewheel coupling does not engage" state of the freewheel coupling is recognized in step 205, the method branches to step 209, in which as an error response a second emergency mode is set, and an error message is output, in particular to the driver, and/or an appropriate entry is made in the error memory. The method is terminated with step 210. This method is continuously repeated during the operation of the vehicle.

Alternatively, if the "recuperation" operating state is instantaneously recognized in step 203, the blocking direction of shiftable freewheel coupling 102 is controlled in such a way that transmission of a torque from drivable axle 101 to electric machine 103 is possible, and the method branches to step 204. The state of the freewheel coupling is queried in step 204. In the present exemplary embodiment, the system is able, to recognize the "freewheel coupling does not engage" and the "freewheel coupling jams" states of the freewheel coupling. Depending on which state of the freewheel coupling is recognized, the method branches to step 206 or 207. If the "freewheel coupling jams" state of the freewheel coupling is recognized, the method branches to step 206, in which as an error response a first emergency mode with greatly limited speed is set, and an error message is output, in particular to the driver, and/or an appropriate entry is made in the error memory. If the "freewheel coupling does not engage" state of the freewheel coupling is recognized in step 204, the method branches to step 207, in which as an error response an error message is output, in particular to the driver, and/or an appropriate entry is made in the error memory.

If it is recognized in step 202 that the vehicle is traveling in reverse, the method branches to step 213. The operating state of the vehicle is queried in step 213. In the present exemplary embodiment, the system is able to recognize the "recuperation" and "acceleration" operating states. If the "acceleration" operating state is instantaneously recognized in step 213, the blocking direction of the shiftable freewheel coupling 102 is controlled in such a way that transmission of a torque from electric machine 103 to drivable axle 101 is possible, and the method branches to step 215. The state of the freewheel coupling is queried in step 215. In the present exemplary embodiment, the system is able to recognize the "freewheel coupling does not engage" and the "freewheel coupling jams" states of the freewheel coupling. Depending on which state of the freewheel coupling is recognized, the method branches to step 218 or 219. If the "freewheel coupling jams" state of the freewheel coupling is recognized, the method branches to step 218, in which as an error response a first emergency mode with greatly limited speed is set and an error message is output, in particular to the driver, and/or an appropriate entry is made in the error memory. If the "freewheel coupling does not engage" state of the freewheel coupling is recognized in step 215, the method branches to step 219, in which as an error response an error message is output, in particular to the driver, and/or an appropriate entry is made in the error memory. Once again, the method is terminated with step 210.

Alternatively, if the "recuperation" operating state is instantaneously recognized in step 213, the blocking direction of shiftable freewheel coupling 102 is controlled in such a way that transmission of a torque from drivable axle 101 to electric machine 103 is possible, and the method branches to step 214. The state of the freewheel coupling is queried in step 214. In the present exemplary embodiment, the system is able to recognize the "freewheel coupling does not engage" and the "freewheel coupling jams" states of the freewheel coupling. Depending on which state of the freewheel coupling is recognized, the method branches to step 216 or 217. If the "freewheel coupling jams" state of the freewheel coupling is recognized, the method branches to step 216, in which as an error response a first emergency mode with greatly limited speed is set, and an error message is output, in particular to the driver, and/or an appropriate entry is made in the error memory. If the "freewheel coupling does not' engage" state of the freewheel coupling is recognized in step 214, the method branches to step 217, in which as an error response a second emergency mode is set, and an error message is output, in particular to the driver, and/or an appropriate entry is made in the error memory.

If the "freewheel coupling jams" and "freewheel coupling does not engage" states of the freewheel coupling are not recognized in steps 204, 205, 214, and 215, the method branches directly to step 210.

What is claimed is:

1. A drive device for a vehicle, comprising:
   an axle;
   an electric machine configured to selectively drive the axle;
   a selectively disengageable mechanical coupling provided between the axle and the electric machine, wherein the mechanical coupling is configured as a selectively engageable freewheel coupling;
   a control unit configured to at least monitor the operation of the freewheel coupling; and
   an actuator configured to be selectively operated in order to control a blocking direction of the freewheel coupling for an acceleration operating state, and selectively not operated in order to control the blocking direction of the freewheel coupling for a recuperation operating state.

2. A method for controlling a drive device of a vehicle, the drive device including an axle, an electric machine configured to (i) selectively drive the axle and (ii) selectively be driven by the axle, and a selectively disengageable mechanical coupling provided between the axle and the electric machine, wherein the mechanical coupling is configured as a selectively engageable freewheel coupling, the method comprising:
   controlling a blocking direction of the freewheel coupling as a function of an acceleration operating state of the vehicle and a recuperation operating state of the vehicle in which the electric machine is driven by the axle, and
   performing an error response as a function of the vehicle operating state and an operating state of the freewheel coupling wherein the freewheel coupling has at least an operating state in which freewheel coupling does not engage and an operating state in which freewheel coupling jams.

3. The method as recited in claim 2, wherein during the recuperation operating state of the vehicle, the operating state in which the freewheel coupling does not engage is ascertained if the rotational speed of the electric machine under electrical load does not correlate with the rotational speed of the axle.

4. The method as recited in claim 2, wherein during the recuperation operating state of the vehicle, the operating state in which the freewheel coupling jams is ascertained if (i) the electric machine is temporarily in motor operation and (ii) the rotational speed of the electric machine correlates with the rotational speed of the axle.

5. The method as recited in claim 4, wherein the temporary motor operation of the electric machine is carried out at periodic intervals during noncritical driving situations.

6. The method as recited in claim 2, wherein the drive device further includes an actuator, and wherein during the recuperation operating state of the vehicle and when an event signal is present, a braking torque is generated at the axle, and the actuator is operated in order to control the blocking direction of the freewheel coupling for the acceleration operating state.

7. The method as recited in claim 2, wherein during the acceleration operating state of the vehicle, the operating state in which the freewheel coupling does not engage is ascertained if the rotational speed of the electric machine (i) rapidly increases and (ii) does not correlate with the rotational speed of the axle.

8. The method as recited in claim 2, wherein the drive device further includes an actuator, and wherein during the acceleration operating state of the vehicle, the operating state in which the freewheel coupling jams is ascertained if, in temporary motor operation of the electric machine, the rotational speed of the electric machine (i) does not increase and (ii) correlates with the rotational speed of the axle, the actuator being temporarily not operated in order to control the blocking direction of the freewheel coupling for the recuperation operating state of the vehicle.

9. The method as recited in claim 2, wherein at least during the operating state in which the freewheel coupling does not engage and during the operating state in which the freewheel coupling jams, at least one of the following is performed: (i) outputting an error message; and (ii) making an entry in the error memory as an error response.

10. The method as recited in claim 2, wherein during the recuperation operating state of the vehicle and the operating state in which the freewheel coupling does not engage, an error message is output to the driver as an error response.

11. The method as recited in claim 2, wherein during the recuperation operating state of the vehicle and the operating state in which the freewheel coupling jams, a first emergency mode is set as an error response, the first emergency mode being characterized by a limited vehicle speed.

12. The method as recited in claim 2, wherein during the acceleration operating state of the vehicle and the operating state in which the freewheel coupling does not engage, an emergency mode is set as an error response.

13. The method as recited in claim 2 wherein during the acceleration operating state of the vehicle and the operating state in which the freewheel coupling jams, a first emergency mode is set as an error response, the first emergency mode being characterized by a limited vehicle speed.

14. A drive device for a vehicle, comprising:
    an axle;
    an electric machine configured to selectively drive the axle;
    a selectively disengageable mechanical coupling provided between the axle and the electric machine, wherein the mechanical coupling is configured as a selectively engageable freewheel coupling; and
    a control unit configured to monitor a correlation between rotation speeds of the axel and the electric machine and identify a faulty state of the freewheel coupling based on the correlation.

15. The drive device as recited in claim 14, wherein the control unit is configured to identify a plurality of faulty states of the freewheeling coupling including a first faulty state in which the freewheel coupling does not engage and a second faulty state in which freewheel coupling jams based on the correlation and an operating state of the vehicle.

* * * * *

UNITED STATES PATENT AND TRADEMARK OFFICE
CERTIFICATE OF CORRECTION

PATENT NO.        : 8,499,866 B2
APPLICATION NO. : 12/998051
DATED             : August 6, 2013
INVENTOR(S)       : Peter Ahner Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 179 days.

Signed and Sealed this

Fifteenth Day of September, 2015

Michelle K. Lee
*Director of the United States Patent and Trademark Office*